Sept. 11, 1956  R. E. WOOD  2,762,858
PUNCHED-CELL WAX ELECTROLYTE BATTERIES
Filed Nov. 18, 1954
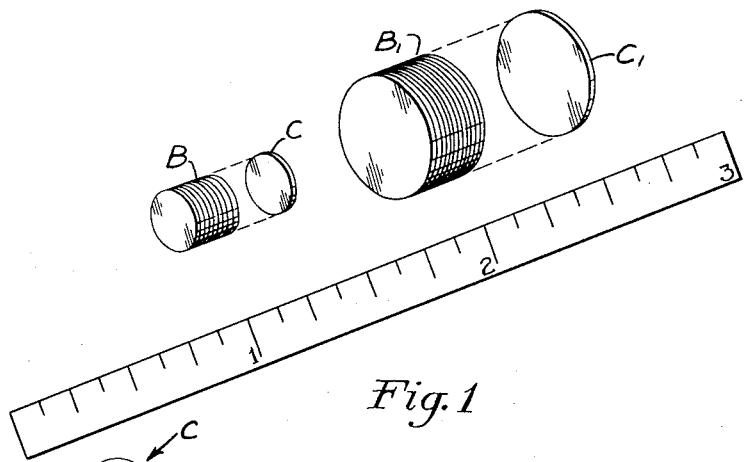
Fig. 1
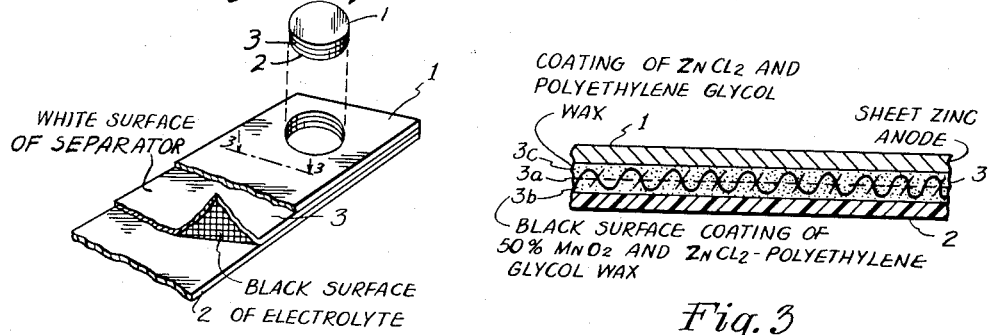
Fig. 2
Fig. 3
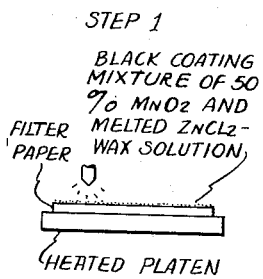
Fig. 4a
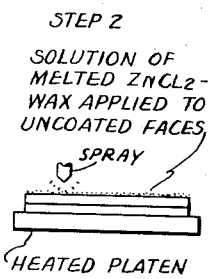
Fig. 4b
Fig. 4c
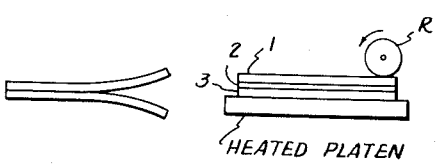
Fig. 4d
INVENTOR
Reuben E. Wood.
BY Arthur Vinograd
ATTORNEY

United States Patent Office 2,762,858
Patented Sept. 11, 1956

2,762,858
PUNCHED-CELL WAX ELECTROLYTE BATTERIES

Reuben E. Wood, Arlington, Va., assignor to the United States of America as represented by the Secretary of Commerce Application November 18, 1954, Serial No. 469,865

11 Claims. (Cl. 136—103)

This invention relates to an improved dry cell construction, including a novel solid electrolyte composition, which is especially adapted to mass production methods.

In general the present invention is concerned with a Leclanche cell type of battery and particularly contemplates improvements in the structural components thereof, whereby multicell battery construction can be performed by simple punching and assembly operations. In known cell constructions the ingredients employed for the anode, cathode, and electrolyte respectively, are such as to require special manufacturing techniques in order to produce a battery of desired voltage and current specification.

The present invention is directed to an improved Zamboni type of dry pile construction. In the conventional Zamboni dry pile, the units which are piled together are not complete primary cell units but comprise separate anode, cathode, and separator discs. An improved version of the basic Zamboni pile is described in an article by A. Elliott appearing on pages 317–319 of Electronic Engineering for October, 1948, as being composed of units which are complete cells in an electrical sense. However, in accordance with the structure therein described, one electrode surface consists of an exposed chemical composition which must be placed in contact with the conducting surface of an adjacent cell in order to be practicable. In accordance with the teachings of the present invention a complete self-contained battery cell consisting of an anode, cathode, and electrolyte are formed as a single unitary sheet which may be easily processed without damage by conventional punching and cutting techniques so as to enable the cascading of elements into a dry battery of any optional size.

It is an immediate object of this invention therefore to provide a dry cell construction in which the three basic electronic components are incorporated into a unitary sheet or plate which may be punched, sheared, or deformed into physically identical components without affecting the electrolytic efficacy of the basic sheet.

Another object of this invention is to provide an improved electrolyte for use in a dry cell which is relatively solid and is susceptible of being punched or sheared with negligible deformation of its cut edges.

A still further object of this invention is to provide a dry cell construction in which the cathodic material does not require the presence of carbon.

A further object of this invention is to provide a dry cell construction which can provide high potentials at very low current drain with a minimum battery size and weight and which has an extremely long shelf life.

It is another object of this invention to provide a method of constructing dry cells which is readily adaptable to inexpensive production techniques and which results in a battery which is insensitive to considerable variation in material composition and details of construction.

In the drawings:

Fig. 1 shows enlarged views of two sizes of battery units which are constructed in accordance with the principles of this invention and particularly demonstrates the extremely small structural dimensions achieved thereby;

Fig. 2 shows the unitary anode-cathode-electrolyte sheet comprising the basic unit of the present invention and further illustrates the manner in which smaller unitary cell components may be fabricated therefrom employing known production methods;

Fig. 3 is an enlarged cross section of the unitary cell taken on line 3—3 of Fig. 2; and Figs. 4a–4d illustrate schematically the significant method steps employed in making a battery cell according to the present invention.

The electrochemistry of the cell formed in accordance with the present invention is related to that of the well-known Leclanche cell. Zinc is employed as the anode, manganese dioxide comprises the cathode, and the electrolyte is formed of a solution including an ionizable salt such as zinc chloride.

In the conventional Leclanche cell the electrolyte is normally formed by dissolving ammonium chloride, zinc chloride, or other chlorides, in an aqueous solution or paste. The present invention employs a polyethylene glycol wax as the electrolyte solvent and further dispenses with the need for mixing carbon with the manganese dioxide. The cells according to the disclosed invention do not use an aqueous or fluid electrolyte. Instead, an electrolyte is employed which is a wax-like solid at normal operating temperatures. Specifically, the electrolyte is comprised of a polyethylene glycol wax as the chief constituent.

The substitution of the solid wax electrolyte is an important factor in facilitating the achievement of long shelf life and compactness of construction. It results in an electrolyte system which is somewhat comparable to types of dry cells employing solid ionic conductors such as silver bromide but possesses considerably more flexibility and requires less expensive construction methods. Moreover, the use of manganese dioxide unmixed with carbon, as compared with conventional constructions, promotes shelf life by removing the possibility of intra-cell or intercell shorting by carbon particles. Any short circuit caused by the manganese dioxide is presumably broken as soon as some of the shorting particles are reduced to lower, non-conducting, oxides of manganese.

The use of a wax-like solid material as the electrolyte in accordance with the present invention makes possible the prefabrication in laminated sheet form of a unitary battery cell in which all of the cell elements are sealed solidly together. The laminate comprises a separator such as filter paper impregnated with the wax electrolyte and placed between sheetlike electrodes such as zinc and conductive plastic respectively. Cathodic materials such as manganese dioxide can be applied, mixed with the wax, either to the separator or to the cathode sheet.

The construction of a representative embodiment of the present invention is shown in the drawings. As shown in Fig. 2, the anode consists of sheet zinc having a thickness of approximately 0.002 inch. The positive plate 2 comprises a sheet of conducting plastic which may be any well known type of conductive vinyl film such as Condulon. Other conductive sheets such as materials consisting of silver, carbon, or carbon-containing conductive material are also satisfactory for such purpose. The electrolyte 3 comprises a solid homogeneous mass made up of a polyethylene glycol wax containing zinc chloride and impregnated in a sheet of filter paper.

A typical polyethylene glycol wax such as Carbowax 4000 in which some approximately anhydrous zinc chloride has been dissolved has been found satisfactory. Both 10 percent and 5 percent zinc chloride mixtures have been employed with no noticeable difference in characteristics of the resulting cells. It is significant to note, however, that the less zinc chloride employed the less is the susceptibility of the electrolyte to hygroscopicity during the ensuing steps of battery assembly. It may also be observed that while some moisture absorption undoubtedly occurs in the process of grinding the zinc chloride and dissolving it in the wax solvent, it has not so far been ascertained whether such small amount of water in the electrolyte is significant in relation to the operations of the cell. Performance tests on a considerable number of batteries made in accordance with this invention but under uncontrolled conditions of humidity and exposure times indicate that such factors, if they appreciably affect the batteries at all, are not critical.

The construction of a typical battery embodying the principles of this invention will be apparent by considering the following representative steps employed. These steps are diagrammatically shown in Figs. 4a–4d.

The electrolyte-separator construction

In making the electrolyte-containing separator, sheets of material such as filter paper (Whatman's No. 2, for example) are employed. Each sheet is placed on a heated platen as shown in Fig. 4a, and one surface of each filter sheet is suitably impregnated with a black coating, as by painting or spraying with a mixture comprising approximately 50 percent manganese dioxide suspended in melted polyethylene glycol wax containing a few percent dissolved zinc chloride, the polyethylene glycol wax being solid at the normal operating temperatures of the battery. This process partially impregnates the paper with the wax. Pairs of these sheets with their black-coated surfaces joined back to back are then reapplied on the heated platen as shown in Fig. 4b, the temperature of which is maintained somewhat above the melting point of the Carbowax or polyethylene glycol wax solvent. Each of the uncoated surfaces of the joined sheets are then coated with a melted polyethylene glycol wax—zinc chloride solution but which is free of manganese dioxide. The broken line 3a indicated in Fig. 3 shows the demarcation between the black coating 3b containing manganese dioxide and the coating 3c which is free of manganese dioxide, respectively. Following such steps, the joined pairs of treated filter papers are separated as shown in Fig. 4c, and each individual sheet is allowed to cool and harden to a rigid mass.

Making the battery cell

The basic primary battery cell unit as shown in Figs. 2 and 3 is formed as an integral laminated sheet incorporating all of the elements of a battery cell, namely the anode, cathode, and electrolyte. The laminated sheet is constructed by sandwiching the sheet 3 of electrolyte-containing separator, which has been fabricated as a homogeneous mass as described, between a first zinc anode sheet 1, which has been thoroughly degreased, and a second sheet 2 of the referred-to conducting material with the black-coated surface 3b of the electrolyte sheet contacting the plastic sheet 2. The resulting laminate is then again placed on the surface of the heated platen, as shown in Fig. 4d, and pressed under roller R, which action smooths out the sheet and forces out any excess electrolyte. The completed sheet is then removed from the platen and cooled until the electrolyte again solidifies, thereby joining the plates 1 and 2 into a single unitary mass. Any electrolyte deposit which may have formed on the outside edges of the sheet is then removed by washing in water. The sheet is then dried and trimmed with a shearing knife.

Formation of a multicell battery

The completed laminated sheet constructed in the manner described is a complete unitary battery cell having a measurable open-circuit voltage of about 1.50 volts. Its physical characteristics are such, moreover, that it is adaptable to conventional punching, shearing, or cutting methods without adverse effects, due to the solid-like consistency of the electrolyte-containing separator employed and the high degree of bonding among the referred-to laminations. Because large single cells can be constructed as described in the form of an extremely thin (i. e., in the order of 0.005 to 0.010 inch) laminated sheet which is sealed together by the adhesive electrolyte-containing separator, it is possible to punch out a number of smaller, but otherwise electrically identical cells from such laminate in a punch press.

As shown in Fig. 2, a plurality of discs or wafers C may easily be punched out of the basic battery-cell sheet, each wafer in turn comprising a unitary battery cell complete in itself. Since it is generally desirable to produce compact, light-weight battery asesmblies, it is convenient to punch out discs of standard ¼-inch and ½-inch diameters to produce battery sizes of the types shown as B and B₁, respectively, in Fig. 1. The batteries are shown in enlarged scale in Fig. 1, but an indication of their extremely small size and compactness is evident upon comparison with the scale. The invention, however, is obviously not limited to the use of discs of the particular sizes shown, since cells of any convenient arbitrary dimension may be employed. Moreover, the specific configuration of the disc is a matter of choice. The use of round discs as illustrated in Figs. 1 and 2 enables low cost cylindrical punches to be used.

When the edges of a punched-out cell are examined under a microscope, there is no apparent drag-over of either the zinc or conductive plastic layers. Moreover, there has been no significant observed separation of the layers of the cell during such punching operations. This is largely due to the fact that a good bond is formed when the zinc sheet employed has been carefully degreased as described. Etching of the zinc with acid before assembly improves adherence. Moreover, the fact that the sheared edges are clean, dry, and clearly defined is of great importance in minimizing the electrical leakage among cells when the individual cell-discs are stacked to form a battery. The lack of overhang in each layer insures against shorting among the plates of the various cells. Such construction also distinguishes over the conventional Zamboni pile type construction in which the stacked units are individual anode, cathode, and separator discs, respectively, whereas, according to the present invention each iindividual disc is a complete cell unit.

A battery assembly, such as B or B₁ in Fig. 1, is easily formed merely by stacking a plurality of the punched wafers in a cylindrical form or rack of corresponding diameter, slightly pressing the wafers together and coating the circumference with a lacquer-like substance. Any high-grade, clear lacquer is satisfactory for such purpose. While the lacquer is conductive when initially applied, it quickly loses such conductivity when the solvent has evaporated. Other edge coatings, such as rubber-base adhesives, may be used.

Typical measured characteristics of both the basic cell and batteries composed thereof are shown in Table 1.

Table 1.—Cell and battery characteristics

| | |
|---|---|
| Open-circuit voltage per cell | 1.50 volts. |
| Internal resistance of a ¼-inch cell at 25° C | $4 \times 10^7$ ohms. |
| Internal resistance of a ½-inch cell at 25° C | $4 \times 10^6$ ohms. |
| Length of 100-volt battery | 0.9 inch. |
| Weight of 100-volt battery, ¼-inch cells | 1.5 grams. |
| Weight of 100-volt battery, ½-inch cells | 6.0 grams. |
| Internal resistance of ½-inch cell at 5° C | $2.5 \times 10^8$ ohms. |

The observed shelf life of batteries constructed according to present invention is excellent. Over an 8-month period, for example, no significant voltage drop has been observed in a 25-cell battery assembly having a nominal voltage of 37½ volts.

Short-circuit tests to measure the internal resistances of the cells indicated in Table 1 have also been conducted. After such tests the cells return to their normal voltage level.

It is logical to assume that the temperature range over which batteries constructed in accordance with the disclosed method will be able to maintain good shelf life and operate satisfactorily will be limited to the temperature ranges established by the melting point of the wax employed in the electrolyte and the temperature at which the internal resistance of a cell becomes sufficiently large to prevent any significant output current. This range can probably be shifted by choosing waxes of different degrees of polymerization. Moreover, for specific applications and special temperature ranges, a specific wax solvent can be employed which exhibits the described characteristics of this invention at the particular temperature required.

While a preferred embodiment of the invention has been shown and described, it is believed that the principles underlying the invention as disclosed may be incorporated in various modifications and variations of the disclosed construction. The use of a unitary cell construction, for example, is not limited to a zinc-zinc-chloride-manganese dioxide system but is adaptable to other electrochemical combinations. However, even the embodiment disclosed differs in at least two significant respects from a conventional dry cell; namely, the use of a solid wax in place of the usual aqueous electrolyte and the absence of powdered carbon from the manganese dioxide mixture.

As already mentioned, the cells which use a wax mixture as a solid electrolyte according to the present invention are somewhat similar to cells which have been proposed and constructed using solid ion conductors such as silver bromide. However, because of the more general solvent power of the wax, because it serves as an ionizing solvent or a solvent for ionic substances rather than being ionic itself, and because it is relatively inert itself toward oxidation or reduction, the wax electrolytes are much more flexible with respect to possible combinations with various electrochemical systems than are the solid ionic conductors such as silver bromide.

In addition, as will be obvious to those skilled in the art, the use of a polyethylene glycol wax type of electrolyte system is susceptible for use in connection with electrolytic devices other than batteries.

It is therefore not intended to limit the principles of the invention disclosed to any particular form or embodiment other than as defined in the claims, since the specific details of construction and arrangement of parts, as shown and described, are by way of illustration only.

What is claimed is:

1. A unitary primary cell construction comprising an integral laminate consisting of a first and second conductive-sheet type anode and cathode and an interposed layer of solid electrolyte, said electrolyte consisting essentially of a mixture of polyethylene glycol wax and a salt selected from the group consisting of the halides of zinc, lithium and manganese in a quantity sufficient to render said mixture electrolytically conductive.

2. An electrolyte for use in a primary cell construction consisting essentially of a solid mass of polyethylene glycol wax in which an ionizable substance comprising a salt selected from the group consisting of halides of zinc, lithium, and manganese in a quantity sufficient to render said mass electrolytically conductive is dissolved.

3. An electrolyte as defined in claim 3 in which said mass is a waxy solid at the normal operating temperature of the cell.

4. An electrolyte for use in a primary cell construction consisting essentially of a solid mass of polyethylene glycol wax combined with a salt selected from the group consisting of zinc chloride, lithium chloride, and manganese chloride in a quantity sufficient to render said mass electrolytically conductive.

5. An electrolyte for use in a primary cell construction comprising a compositon of a solid mass of polyethylene glycol wax including between 5 and 10 percent of a salt selected from the group consisting of zinc chloride, lithium chloride, and manganese chloride.

6. An electrolyte-containing separator for use in a primary cell construction comprising a matrix grid, a first solid coating consisting of a composition including zinc chloride dissolved in a polyethylene glycol wax and mixed with manganese dioxide, forming one surface of said grid, and a second solid coating consisting of an electrolyte composition of zinc chloride dissolved in a polyethylene glycol wax forming the other surface of said grid.

7. An electrolyte-containing separator for use in a primary cell construction comprising a matrix grid, a first solid coating consisting of a composition including between 5 to 10 percent of zinc chloride dissolved in a polyethylene glycol wax and mixed with 50 percent of manganese dioxide, forming one surface of said grid, and a second solid coating consisting of an electrolyte composition including between 5 to 10 percent zinc chloride dissolved in a polyethylene glycol wax, forming the other surface of said grid.

8. A unitary primary cell construction comprising an integral laminate consisting of a first zinc anode sheet, a second sheet of conductive plastic coated with manganese dioxide, and an electrolyte consisting essentially of an intermediate layer of solid polyethylene glycol wax mixed with zinc chloride in a quantity sufficient to render said layer electrolytically conductive and bonded to said first and second sheets, respectively.

9. A unitary primary cell construction comprising an integral laminate consisting of a first zinc anode sheet, a second sheet of conductive plastic and an intermediate solid electrolyte-containing separator bonded to each of said sheets and comprising a homogeneous polyethylene glycol wax sheet, the surface of which in contact with the zinc anode includes dissolved zinc chloride and the surface of which in contact with said second sheet includes a mixture of zinc chloride and manganese dioxide.

10. A unitary primary cell construction comprising an integral laminate consisting of a first zinc anode sheet, a second sheet of conductive plastic and an intermediate solid electrolyte-containing separator bonded to each of said sheets and comprising a matrix grid, a first solid coating of an electrolyte composition including between 5 to 10 percent of zinc chloride dissolved in a polyethylene glycol wax impregnated in the surface of said grid in bonded contact with said first sheet, a second solid coating of a composition including between 5 to 10 percent of zinc chloride dissolved in a polyethylene glycol wax and mixed with 50 percent manganese dioxide impregnated in the opposite surface of said grid in bonded contact with said second sheet.

11. A thin, unitary primary cell construction comprising a positive sheet electrode of electronically conducting, chemically inert material, a negative sheet electrode of electronically conductive, chemically active material selected from the group consisting of zinc, tin, manganese, magnesium, and aluminum, and an interposed layer of a solid electrolyte-containing separator in bonding contact with said positive and negative sheets, said layer having one surface consisting of a composition of zinc chloride, manganese dioxide and polyethylene glycol wax in bonded contact with said positive sheet electrode and an obverse surface consisting of an electrolyte composition of zinc chloride and polyethylene glycol wax in bonded contact with said negative sheet electrode.

References Cited in the file of this patent

UNITED STATES PATENTS

| | | |
|---|---|---|
| 1,613,585 | Dam | Jan. 5, 1927 |
| 2,692,228 | Clancy | Oct. 19, 1954 |
| 2,701,272 | Reiner | Feb. 1, 1955 |